United States Patent [19]

Gale

[11] 4,295,341
[45] Oct. 20, 1981

[54] WATER CHILLING PLANT

[75] Inventor: John A. Gale, Pulborough, England

[73] Assignee: A.P.V. Spiro-Gills Limited, West Sussex, England

[21] Appl. No.: 71,840

[22] Filed: Sep. 4, 1979

[30] Foreign Application Priority Data

Sep. 5, 1978 [GB] United Kingdom ............... 35666/78

[51] Int. Cl.³ .............................................. F25B 19/00
[52] U.S. Cl. ........................................ 62/100; 62/116; 62/268; 62/500
[58] Field of Search .................. 62/100, 116, 268, 500

[56] References Cited

U.S. PATENT DOCUMENTS

| | | | |
|---|---|---|---|
| 1,483,990 | 2/1924 | Schmidt | 62/116 |
| 2,026,233 | 12/1935 | Kirgan | 62/100 |
| 2,044,811 | 6/1936 | Randel | 62/116 |
| 2,064,609 | 12/1936 | Humble | 62/116 |
| 2,206,428 | 7/1940 | Reavis | 62/2 |

FOREIGN PATENT DOCUMENTS

| | | |
|---|---|---|
| 513790 | 12/1930 | Fed. Rep. of Germany . |
| 1117146 | 11/1961 | Fed. Rep. of Germany . |
| 1538319 | 12/1966 | France . |
| 2372643 | 6/1978 | France . |
| 371676 | 4/1932 | United Kingdom . |
| 967675 | 8/1964 | United Kingdom . |

*Primary Examiner*—Ronald C. Capossela
*Attorney, Agent, or Firm*—Basile, Weintraub & Hanlon

[57] ABSTRACT

In a water chilling plant and method, normally with two or more stages of vacuum chilling, the vapor from the chilling stage or stages is presented to an air cooled heat exchanger for condensation in two different flow streams at different stages of compression, so that the cooler air nearer the air inlet works on vapor at a lower stage of compression.

9 Claims, 1 Drawing Figure

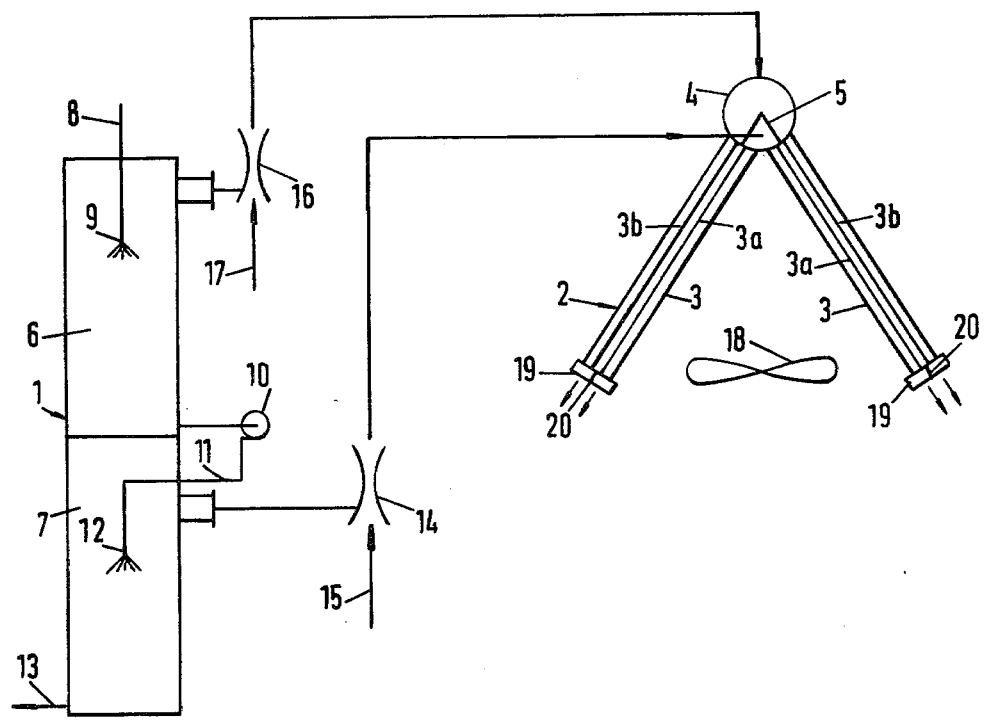

WATER CHILLING PLANT

This invention relates to water chilling plants, and more particularly to such plants using vacuum chilling.

It is normal practice that water is chilled by subjecting it to a vacuum whereby the temperature of the water entering a vacuum chamber is above the boiling point of water at that pressure. Consequently, evaporation takes place and the water cools. In order to achieve this result, a fairly high vacuum, e.g. of the order of 1 to 10 mm Hg (torr), is necessary. The water vapour has to be removed to maintain the vacuum and to do this it is normally compressed, either using a mechanical compressor or a steam jet compressor otherwise known as a thermo-compressor. After compression the mixture of steam and water vapour is condensed in a condenser. The condenser can be either water cooled or air cooled, the choice depending on availability of water and the most economic assessment of capital and running costs using water or air.

In order to reduce the amount of work done through the compression stage, multi-stage vacuum chillers are sometimes used so that the water is subjected to multiple evaporation stages, each at a successively higher vacuum. Compression of the water vapour therefore takes place over successively more arduous compression ranges, instead of over one single most arduous compression stage as occurs with single stage chilling.

The present invention relates primarily to multistage vacuum chilling using air-cooled heat exchangers, which normally consist of a number of tubes, which are usually finned and set between two headers; the whole being called a bundle. Air is forced or induced through the bundle from the bottom, or in the case of a pair of bundles arranged as an A frame, from the inside to the outside. As it passes through the bundle the air heats up so that each successive row of tubes is subjected to a higher temperature of air. Consequently in a normal air cooled condenser the vapour to be condensed has to be at a temperature higher than the exit air temperature. Therefore the water vapour from the vacuum chiller has to be compressed sufficiently that its condensing temperature is above the outlet temperature from the air-cooled heat exchanger bundle.

Thus, there is a very considerable consumption of energy involved in this compression of the vapour. However, the practice has been established and used for some considerable time.

The present invention is based on the realization that the vapour to be cooled and condensed in the rows of tubes nearer the air inlet does not have to be compressed to such an extent as that being condensed in the tubes nearer the air outlet and that by providing separate flows to different rows or groups or rows of tubes, considerable, hitherto unlooked for, energy savings could be achieved.

According to a first aspect of the invention, there is provided a method of chilling water in a vacuum-chilling plant having one or more successive chilling stages, wherein the vapour from the one or each chilling stage is compressed and condensed in an air-cooled heat exchanger, in which the vapour is fed to the heat exchanger in two or more separate flows at different states of compression whereby the cooler air near the air inlet condenses vapor at a lower stage of compression than the warmer air nearer the air outlet.

According to a second aspect of the invention, there is provided a vacuum chilling plant comprising at least one chilling stage, compressors for drawing off the vapour from the one or each stage and passing it in a compressed state to an air cooled tubular heat exchanger for condensation, in which the flow of vapour to the heat exchanger is in two or more streams at different states of compression e.g. by emanating from different chilling stages or groups of chilling stages, with the stream of vapour at the lower state of compression being passed to heat exchanger tubes exposed to warmer air nearer the air outlet from the heat exchanger while the stream of vapour at the higher state of compression is passed to the tubes exposed to the cooler air nearer the air inlet.

An air cooled heat exchanger normally comprises a bank of tubes arranged in rows extending between an inlet header and an outlet header, and for use in the present invention the inlet header is divided to provide for separate flows to different rows or groups of rows.

The rows of tubes in the heat exchanger are thus arranged so that they form more than one stage of condensing. The water vapour from a multi-stage chiller is fed so that vapour evaporated from the higher vacuum is compressed and fed to that part of the air cooled heat exchanger which is closest to the inlet air. The next highest vacuum stage is connected to the next part of the heat exchanger in contact with the air and so on. It is not necessary to have the same number of stages in the heat exchangers as in the vacuum chiller—e.g. a 4-stage vacuum chiller could have the compressed vapour from the first 2 stages connected to the last stage of an air cooled condenser and the last 2 stages of compressed vapour connected to the first stage in the condenser. Also, a single stage chiller could have vapour drawn from it to two compressors giving different states of compression, and the two streams so formed could be fed separately to the condenser.

In this way the vapour from the chiller does not all have to be compressed to the highest pressure and consequently there is a reduction in the amount of steam required to effect the compression. In one such example, it was found that a 2-stage vacuum chiller passing to a normal air cooled condenser would show a saving of 12% of the compression power compared with a single stage chiller. By converting the 2-stage chiller to 2-stage chiller with a 2-stage condenser, a further 15% saving in stream required was found to be possible.

The invention will be further described with reference to the accompanying drawing of which the single FIGURE is a flow diagram showing a preferred form of chilling plant according to the invention.

The drawing shows a 2-stage vacuum chiller 1. There is also 2-stage condensation in an air cooled heat exchanger 2 formed by two banks 3 of finned tubes arranged in an A-formation with an inlet header shown at 4 divided by a partition 5.

The chiller 1 comprises a first vacuum chamber 6 and a second vacuum chamber 7. Water enters via a line 8 and nozzle 9 into the vacuum chamber 6 and is cooled by a first stage of evaporation. The water from the lower side of the vacuum chamber 6 is drawn by a pump 10 and passed via a line 11 and nozzle 12 into the vacuum chamber 7 which is at a higher vacuum so that a second stage of evaporation and further chilling takes place. The chilled water is drawn-off via a line 13. The vacuum is maintained by drawing off the vapour from the second chiller stage 7 by a first thermo-compressor 14 fed with steam from a line 15 and the vapour is passed in this compressed state to one part of the inlet header 4. Similarly, the vacuum in the chiller 6 is maintained by drawing off the vapour from the first stage chiller 6 by a second thermo-compressor 16 fed with steam from a line 17. The vapour passed in a somewhat more compressed state to the other section of the inlet header 4.

The finned tubes in the banks 3 are arranged in rows, and it will be appreciated that the rows of tubes, represented by lines 3a, nearer the air inlet, will have somewhat cooler air passing over them than the rows of tubes, represented by line 3b, nearer the outlet. Air is blown over the banks of tubes by means of a fan indicated at 18. It will be seen that the less compressed vapour from the thermo-compressor 14 is passed through the rows of tubes 3a, whereas the more compressed vapour from the thermo-compressor 16 is passed over the tubes 3b.

The condensate is passed to outlet headers 19 of the tube banks and thence to hot wells. The outlet headers are also shown as divided by partitions 20.

It will be appreciated that although only a single line 3a or 3b is shown in each tube bank, this may represent two or more rows of tubes.

In a further alternative arrangement, each condensation stage may in fact constitute a complete bank of tubes with an individual header rather than having a divided header. Also, the splitting of flows as between two banks of tubes arranged in an A-formation is not always necessary.

Further it will be appreciated that while the invention has been shown as a 2-stage chiller followed 2-stage condensation, more than two stages of chilling may be used and the number of condensation stages need not necessarily be in one-to-one relationship with the number of chilling stages.

Also, a single stage chiller could have the vapour drawn from it by two thermocompressors giving rise to different stages of compression, and the two streams fed separately to the condensing air cooled heat exchanger.

As an example of the temperatures and pressures involved in a fairly typical vacuum chilling plant, the incoming water in line 8 may be at 85° F. (29.4° C.). The first stage chilling chamber may be at a pressure of 0.506 psi (3490 N/M$^2$) so that the water is chilled to approximately 80° F. (26.7° C.). The second stage chiller 7 may be at a pressure of 0.43 psi (2966 N/M$^2$) and the water may finally emerge at the line 13 at a temperature of 75° F. (23.9° C.). The air at the inlet to the heat exchangers 3 may be at a temperature of 87° F. (30.5° C.) and the air leaving the heat exchangers may be at a temperature of 104° F. (40° C.). The thermo-compressor 14 may compress the vapour to a pressure of 1.275 psi (8793 N/M$^2$) so that this vapour enters the exchangers at 110° F. (43.3° C.) and the thermo-compressor 16 may compress its vapour to 1.471 psi (10144 N/M$^2$) and this vapour would enter the header 4 at a temperature of 115° F. (46° C.).

Various modifications may be made within the scope of the invention.

I claim:

1. In a method of chilling water in a vacuum chilling plant having at least two chilling states wherein the vapour from each chilling state is condensed in a multi stage air-cooled heat exchanger, having an air inlet and an air outlet the improvement comprising:

feeding the vapour to the heat exchanger in at least two separate flows at different states of compression and temperature whereby the cooler air near the air inlet condenses vapour at a lower temperature and the warmer air nearer the air outlet condenses vapour at a higher temperature.

2. A method as claimed in claim 1, in which the plant has at least two successive chilling stages at different pressures, and in which the separate flows of vapour are derived from the different chilling stages.

3. A method as claimed in claim 1, in which the vapour is compressed by thermo-compressors.

4. In a vacuum chilling plant comprising at least two chilling states, compressors for drawing off the vapour from each state and passing it in compressed state to an air cooled tubular heat exchanger having an air inlet and an air outlet for condensation, the improvement comprising: the flow of vapour to the heat exchanger being in at least two streams at different temperatures, with the stream of vapour at the higher temperature being passed to heat exchanger, tubes exposed to warmer air nearer the air outlet from the heat exchanger while the stream of vapour at the lower temperature being passed to the tubes exposed to the cooler air nearer the air inlet.

5. A vacuum chilling plant as claimed in claim 4, in which the plant has at least two successive chilling stages and in which the vapour stream at the lower state of compression is derived from an earlier chilling stage than the stream of vapour at the higher state of compression.

6. A vacuum chilling plant as claimed in claim 4, in which the tubes of the heat exchanger are finned.

7. A vacuum chilling plant as claimed in claim 5, comprising two chilling stages and two condensing stages.

8. A vacuum chilling plant as claimed in claim 4, in which the air-cooled heat exchanger comprises a bank of tubes arranged in rows extending between each inlet header and an outlet header, and in which the inlet header is divided to provide for separate flows to different rows.

9. A vacuum chilling plant as claimed in claim 8 wherein the tubes are finned and are arranged in banks separated by a partition and joined to a header to form an "A" formation, the header divided to provide separate flows to each side of the partition.

* * * * *